United States Patent
Gounares et al.

(10) Patent No.: US 8,726,255 B2
(45) Date of Patent: May 13, 2014

(54) RECOMPILING WITH GENERIC TO SPECIFIC REPLACEMENT

(75) Inventors: Alexander G. Gounares, Kirkland, WA (US); Charles D. Garrett, Woodinville, WA (US)

(73) Assignee: Concurix Corporation, Kirkland, WA (US)

( * ) Notice: Subject to any disclaimer, the term of this patent is extended or adjusted under 35 U.S.C. 154(b) by 54 days.

(21) Appl. No.: 13/461,757

(22) Filed: May 1, 2012

(65) Prior Publication Data

US 2012/0233601 A1    Sep. 13, 2012

(51) Int. Cl.
*G06F 9/45* (2006.01)

(52) U.S. Cl.
USPC ........... 717/158; 717/151; 717/140; 717/141; 717/145; 717/154

(58) Field of Classification Search
None
See application file for complete search history.

(56) References Cited

U.S. PATENT DOCUMENTS

| | | | |
|---|---|---|---|
| 3,643,227 A | 2/1972 | Smith et al. | |
| 4,631,674 A | 12/1986 | Blandy | |
| 4,942,512 A | 7/1990 | Kohno | |
| 5,379,428 A | 1/1995 | Belo | |
| 5,414,848 A | 5/1995 | Sandage et al. | |
| 5,506,987 A | 4/1996 | Abramson et al. | |
| 5,768,505 A | 6/1998 | Gilchrist et al. | |
| 5,826,081 A | 10/1998 | Zolnowsky | |
| 5,860,008 A * | 1/1999 | Bradley | 717/137 |
| 5,900,001 A | 5/1999 | Wolczko et al. | |
| 5,903,900 A | 5/1999 | Knippel et al. | |
| 6,006,235 A | 12/1999 | Macdonald et al. | |
| 6,038,572 A | 3/2000 | Schwartz et al. | |
| 6,047,295 A | 4/2000 | Endicott et al. | |
| 6,098,080 A | 8/2000 | Endicott et al. | |
| 6,104,962 A | 8/2000 | Sastry | |
| 6,108,683 A | 8/2000 | Kamada et al. | |
| 6,128,642 A | 10/2000 | Doraswamy et al. | |
| 6,148,324 A | 11/2000 | Ransom et al. | |
| 6,151,701 A | 11/2000 | Humphreys et al. | |

(Continued)

FOREIGN PATENT DOCUMENTS

EP    1912119 A    4/2008

OTHER PUBLICATIONS

Mark N. Wegman, "Constant Propagation with Conditional Branches", ACM Transactions on Programming Languages and Systems, vol. 13, No. 2, Apr. 1991, pp. 181-210.*

(Continued)

*Primary Examiner* — Lewis A Bullock, Jr.
*Assistant Examiner* — Wynuel Aquino
(74) *Attorney, Agent, or Firm* — Russell S. Krajec (57) ABSTRACT

Executable code may be recompiled so that generic portions of code may be replaced with specific portions of code. The recompilation may customize executable code for a specific use or configuration, making the code lightweight and executing faster. The replacement mechanism may replace variable names with fixed values, replace conditional branches with only those branches which are known to be executed, and may eliminate executable code portions that are not executed. The replacement mechanism may comprise identifying known values defined in the executable code for variables, and replacing those variables with the constant value. Once the constants are substituted, the code may be analyzed to identify branches that may be evaluated using the constant values. Those branches may be reformed using the constant value and the rest of the conditional code that may not be accessed may be removed.

9 Claims, 5 Drawing Sheets

(56) References Cited

U.S. PATENT DOCUMENTS

| | | |
|---|---|---|
| 6,205,471 B1 | 3/2001 | Gilchrist et al. |
| 6,230,183 B1 | 5/2001 | Yocom et al. |
| 6,289,360 B1 | 9/2001 | Kolodner et al. |
| 6,308,319 B1 | 10/2001 | Bush et al. |
| 6,317,756 B1 | 11/2001 | Kolodner et al. |
| 6,421,704 B1 | 7/2002 | Waldo et al. |
| 6,460,068 B1 | 10/2002 | Novaes |
| 6,469,968 B1 | 10/2002 | Van Den Enden et al. |
| 6,484,188 B1 | 11/2002 | Kwong et al. |
| 6,490,599 B2 | 12/2002 | Kolodner et al. |
| 6,490,612 B1 | 12/2002 | Jones et al. |
| 6,516,461 B1 | 2/2003 | Ichisugi |
| 6,519,615 B1 | 2/2003 | Wollrath et al. |
| 6,542,978 B2 | 4/2003 | Goldstein et al. |
| 6,560,773 B1 | 5/2003 | Alexander, III et al. |
| 6,564,240 B2 | 5/2003 | Waldo et al. |
| 6,631,466 B1 | 10/2003 | Chopra et al. |
| 6,658,449 B1 | 12/2003 | Brenner et al. |
| 6,681,220 B1 | 1/2004 | Kaplan et al. |
| 6,681,344 B1 | 1/2004 | Andrew |
| 6,735,769 B1 | 5/2004 | Brenner et al. |
| 6,738,757 B1 | 5/2004 | Wynne et al. |
| 6,738,875 B1 | 5/2004 | Wang |
| 6,748,593 B1 | 6/2004 | Brenner et al. |
| 6,751,711 B1 | 6/2004 | De Buda |
| 6,760,736 B2 | 7/2004 | Waldo et al. |
| 6,763,520 B1 | 7/2004 | Seeds |
| 6,779,182 B1 | 8/2004 | Zolnowsky |
| 6,823,515 B2 | 11/2004 | Livecchi |
| 6,832,370 B1 | 12/2004 | Srinivasan et al. |
| 6,868,488 B2 | 3/2005 | Garthwaite |
| 6,873,952 B1 | 3/2005 | Bailey et al. |
| 6,892,237 B1 | 5/2005 | Gai et al. |
| 6,912,554 B2 | 6/2005 | Yuasa |
| 6,918,111 B1 | 7/2005 | Damron et al. |
| 6,925,642 B1 | 8/2005 | Commander |
| 6,925,644 B2 | 8/2005 | Waldo et al. |
| 6,954,775 B1 | 10/2005 | Shanklin et al. |
| 6,981,258 B1 | 12/2005 | Takakura |
| 6,986,140 B2 | 1/2006 | Brenner et al. |
| 6,993,767 B2 | 1/2006 | Brenner et al. |
| 6,996,625 B2 | 2/2006 | Kaplan et al. |
| 6,999,979 B2 | 2/2006 | Garthwaite |
| 7,003,760 B1 | 2/2006 | Das |
| 7,016,923 B2 | 3/2006 | Garthwaite et al. |
| 7,031,990 B2 | 4/2006 | Garthwaite |
| 7,035,884 B2 | 4/2006 | Garthwaite |
| 7,058,670 B2 | 6/2006 | Garthwaite |
| 7,062,518 B2 | 6/2006 | Garthwaite |
| 7,062,519 B2 | 6/2006 | Garthwaite |
| 7,069,279 B1 | 6/2006 | Rau et al. |
| 7,069,280 B2 | 6/2006 | Garthwaite |
| 7,069,281 B2 | 6/2006 | Garthwaite |
| 7,092,978 B2 | 8/2006 | Garthwaite |
| 7,096,238 B2 | 8/2006 | Garthwaite |
| 7,136,887 B2 | 11/2006 | Garthwaite et al. |
| 7,143,124 B2 | 11/2006 | Garthwaite |
| 7,188,129 B2 | 3/2007 | Garthwaite |
| 7,207,038 B2 | 4/2007 | Bicsak et al. |
| 7,209,935 B2 | 4/2007 | Garthwaite |
| 7,225,439 B2 | 5/2007 | Garthwaite |
| 7,228,541 B2 | 6/2007 | Gupton et al. |
| 7,251,815 B2 | 7/2007 | Donovan et al. |
| 7,308,466 B2 | 12/2007 | Houldsworth |
| 7,343,523 B2 * | 3/2008 | Cheong et al. ............. 714/38.12 |
| 7,380,005 B1 | 5/2008 | Li et al. |
| 7,395,258 B2 | 7/2008 | Altinel et al. |
| 7,404,182 B1 | 7/2008 | Garthwaite et al. |
| 7,406,685 B2 | 7/2008 | Fleehart et al. |
| 7,412,580 B1 | 8/2008 | Garthwaite |
| 7,441,240 B2 | 10/2008 | Amano et al. |
| 7,487,237 B2 | 2/2009 | Lloyd et al. |
| 7,487,247 B1 | 2/2009 | Li et al. |
| 7,565,386 B2 | 7/2009 | Joisha |
| 7,565,499 B1 | 7/2009 | Garthwaite |
| 7,599,973 B2 | 10/2009 | Detlefs et al. |
| 7,613,753 B2 | 11/2009 | Cornet et al. |
| 7,640,544 B2 | 12/2009 | Flood et al. |
| 7,752,417 B2 | 7/2010 | Manczak et al. |
| 7,797,670 B2 | 9/2010 | Bumgarner et al. |
| 7,840,966 B2 | 11/2010 | Dodge et al. |
| 7,865,707 B2 | 1/2011 | Bittlingmayer et al. |
| 7,869,363 B2 | 1/2011 | Shamilian et al. |
| 7,870,554 B2 | 1/2011 | Dodge et al. |
| 7,890,712 B2 | 2/2011 | Bitner et al. |
| 7,926,042 B2 * | 4/2011 | Mehta et al. ................... 717/130 |
| 7,945,577 B2 | 5/2011 | Altinel et al. |
| 7,984,083 B2 | 7/2011 | Bacon et al. |
| 7,996,446 B2 | 8/2011 | Bacon et al. |
| 8,010,822 B2 | 8/2011 | Marshall et al. |
| 8,028,277 B2 | 9/2011 | Breitgand et al. |
| 8,055,725 B2 | 11/2011 | Alam et al. |
| 8,108,863 B2 | 1/2012 | Rakvic et al. |
| 8,190,939 B2 | 5/2012 | Fields, Jr. et al. |
| 8,195,859 B2 | 6/2012 | Le Moal |
| 8,495,598 B2 | 7/2013 | Gounares et al. |
| 2001/0018701 A1 | 8/2001 | Livecchi |
| 2002/0129340 A1 | 9/2002 | Tuttle |
| 2003/0200356 A1 | 10/2003 | Hue |
| 2003/0212731 A1 | 11/2003 | Brenner et al. |
| 2004/0025163 A1 | 2/2004 | Babutzka et al. |
| 2004/0031035 A1 | 2/2004 | Shiu et al. |
| 2004/0064809 A1 * | 4/2004 | Liu et al. ....................... 717/158 |
| 2004/0088690 A1 | 5/2004 | Shaul |
| 2004/0158831 A1 | 8/2004 | Amano et al. |
| 2004/0194104 A1 | 9/2004 | Beresnevichiene et al. |
| 2004/0225996 A1 | 11/2004 | Venkatesan et al. |
| 2005/0018695 A1 | 1/2005 | Ramaswamy et al. |
| 2005/0060697 A1 | 3/2005 | Bicsak et al. |
| 2005/0071847 A1 | 3/2005 | Bentley et al. |
| 2005/0144364 A1 | 6/2005 | Tu et al. |
| 2005/0166193 A1 | 7/2005 | Smith et al. |
| 2005/0210472 A1 | 9/2005 | Accapadi et al. |
| 2005/0229165 A1 | 10/2005 | Ma et al. |
| 2005/0289252 A1 | 12/2005 | Kim et al. |
| 2006/0064313 A1 | 3/2006 | Steinbarth et al. |
| 2006/0101438 A1 * | 5/2006 | Mariani ........................ 717/148 |
| 2006/0184776 A1 | 8/2006 | Bishop et al. |
| 2006/0206881 A1 | 9/2006 | Dodge et al. |
| 2006/0212945 A1 | 9/2006 | Donlin et al. |
| 2006/0294167 A1 | 12/2006 | Borman et al. |
| 2007/0006293 A1 | 1/2007 | Balakrishnan et al. |
| 2007/0061788 A1 | 3/2007 | Dodge et al. |
| 2007/0061809 A1 | 3/2007 | Dodge et al. |
| 2007/0206611 A1 | 9/2007 | Shokri et al. |
| 2007/0226739 A1 | 9/2007 | Dodge et al. |
| 2007/0288911 A1 | 12/2007 | Martin et al. |
| 2008/0005719 A1 | 1/2008 | Morris |
| 2008/0028391 A1 | 1/2008 | Nallipogu et al. |
| 2008/0126453 A1 | 5/2008 | Cornet et al. |
| 2008/0139191 A1 | 6/2008 | Melnyk et al. |
| 2008/0209395 A1 | 8/2008 | Ernst |
| 2008/0235701 A1 | 9/2008 | Danko |
| 2008/0244565 A1 | 10/2008 | Levidow et al. |
| 2008/0271030 A1 | 10/2008 | Herington |
| 2008/0271032 A1 | 10/2008 | Twaddle |
| 2009/0049421 A1 | 2/2009 | Meijer et al. |
| 2009/0083746 A1 | 3/2009 | Katsumata |
| 2009/0089552 A1 | 4/2009 | Inchingolo et al. |
| 2009/0089771 A1 | 4/2009 | Gill et al. |
| 2009/0119774 A1 | 5/2009 | Moss |
| 2009/0219814 A1 | 9/2009 | Shamilian et al. |
| 2009/0235251 A1 | 9/2009 | Li et al. |
| 2009/0296573 A1 | 12/2009 | Shamilian et al. |
| 2010/0018701 A1 | 1/2010 | Peter et al. |
| 2010/0199269 A1 * | 8/2010 | Hattori et al. ................. 717/146 |
| 2010/0262952 A1 * | 10/2010 | Colton et al. ................. 717/118 |
| 2010/0318630 A1 | 12/2010 | Howell et al. |
| 2010/0333109 A1 | 12/2010 | Milnor |
| 2011/0067030 A1 | 3/2011 | Isard et al. |
| 2011/0078699 A1 | 3/2011 | Donlin et al. |

(56) References Cited

U.S. PATENT DOCUMENTS

| | | |
|---|---|---|
| 2011/0107342 A1 | 5/2011 | Dodge et al. |
| 2011/0138373 A1* | 6/2011 | Lane et al. .................... 717/157 |
| 2011/0191783 A1 | 8/2011 | Le Moal |
| 2011/0276832 A1 | 11/2011 | Schneider et al. |
| 2012/0047514 A1 | 2/2012 | Seo et al. |
| 2012/0204189 A1 | 8/2012 | Eichenberger et al. |
| 2012/0222019 A1 | 8/2012 | Gounares et al. |
| 2012/0222043 A1 | 8/2012 | Gounares et al. |
| 2012/0227040 A1 | 9/2012 | Gounares |
| 2012/0233592 A1 | 9/2012 | Gounares |
| 2012/0233601 A1 | 9/2012 | Gounares et al. |
| 2012/0284730 A1 | 11/2012 | Decusatis et al. |
| 2012/0297163 A1 | 11/2012 | Breternitz et al. |
| 2012/0317371 A1 | 12/2012 | Gounares |
| 2012/0317389 A1 | 12/2012 | Gounares |
| 2012/0317421 A1 | 12/2012 | Gounares |
| 2012/0317557 A1 | 12/2012 | Garrett |
| 2012/0317577 A1 | 12/2012 | Garrett |
| 2012/0317587 A1 | 12/2012 | Garrett |
| 2012/0324454 A1 | 12/2012 | Gounares et al. |
| 2013/0055278 A1 | 2/2013 | Zaitsev |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0117753 A1 | 5/2013 | Gounares et al. |
| 2013/0117759 A1 | 5/2013 | Gounares et al. |
| 2013/0219057 A1 | 8/2013 | Li et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0229416 A1 | 9/2013 | Krajec et al. |
| 2013/0232174 A1 | 9/2013 | Krajec et al. |
| 2013/0232433 A1 | 9/2013 | Krajec et al. |
| 2013/0232452 A1 | 9/2013 | Krajec et al. |

OTHER PUBLICATIONS

International Searching Authority, Korean Intellectual Property Office, International Search Report and Written Opinion, PCT/USS2012/056711, Mar. 22, 2013.

Daniel Lenoski, James Laudon, Kourosh Gharachorloo, Wolf-Dietrich Weber, Anoop Gupta, John Hennessy, Mark Horowitz,and Monica S. Lam, The Stanford Dash Multiprocessor, Mar. 1992, IEEE.

International Search Authority, International Search Report and Written Opinion, Korean Intellectual Property Office, PCT/US2012/066098, Mar. 12, 2013.

International Search Authority, International Search Report and Written Opinion, Korean Intellectual Property Office, PCT/US2012/045964, Jan. 24, 2013.

International Search Authority, International Search Report and Written Opinion, Korean Intellectual Property Office, PCT/US2013/037310, Jun. 26, 2013.

International Search Authority, International Search Report and Written Opinion, Korean Intellectual Property Office, PCT/US2012/066091, Mar. 12, 2013.

International Search Authority, International Search Report and Written Opinion, Korean Intellectual Property Office, PCT/US2012/043811, Jan. 29, 2013.

International Search Authority, International Search Report and Written Opinion, Korean Intellectual Property Office, PCT/US2012/056701, Feb. 27, 2013.

International Search Authority, International Search Report and Written Opinion, Korean Intellectual Property Office, PCT/US2012/056707, Feb. 5, 2013.

International Search Authority, International Search Report and Written Opinion, Korean Intellectual Property Office, PCT/US2012/056704, Feb. 5, 2013.

International Search Authority, International Search Report and Written Opinion, Korean Intellectual Property Office, PCT/US2012/041036, Jan. 25, 2013.

Kistler, Thomas, "Continuous Program Optimization", PhD Dissertation, University of California, Irvine, 1999.

Kistler, Thomas, "Continuous Program Optimization: A Case Study", ACM Transactions on Programming Languages and Systems, vol. 25, No. 4, Jul. 2003, pp. 500-548.

Tong Li, Dan Baumberger, David A. Koufaty, and Scott Hahn, Efficient Operating System Scheduling for Performance-Asymmetric Multi-Core Architectures, Copyright 2007, ACM.

Yang Wang, Paul Lu, Using Dataflow Information to Improve Inter-Workflow Instance Concurrency, 2005, IEEE.

* cited by examiner

RECOMPILING WITH GENERIC TO SPECIFIC REPLACEMENT

BACKGROUND

Many computer programs are written in a reusable style, where functions may be called using variables that may change each time the function may be called. Such a programming style has many uses, such as being able to test and verify each function independently, as well as having sections of executable code that may be reused over and over.

In order to create executable code from such a program, a compiler and linker may create and track all of the connections between many different sections of code.

SUMMARY

Executable code may be recompiled so that generic portions of code may be replaced with specific portions of code. The recompilation may customize executable code for a specific use or configuration, making the code lightweight and executing faster. The replacement mechanism may replace variable names with fixed values, replace conditional branches with only those branches which are known to be executed, and may eliminate executable code portions that are not executed. The replacement mechanism may comprise identifying known values defined in the executable code for variables, and replacing those variables with the constant value. Once the constants are substituted, the code may be analyzed to identify branches that may be evaluated using the constant values. Those branches may be reformed using the constant value and the rest of the conditional code that may not be accessed may be removed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Executable code may be recompiled to make the executable code more specific for an instance that may be executed. The code may be analyzed to identify variables that may be replaced by constants, then branches of the code that can be determined given the constants may be evaluated and streamlined. In some cases, code that cannot be reached once the constants are known may be removed from the executable code.

Recompiling executable code may attempt to streamline and speed up execution of the code by replacing variables with constants. The executable code may be developed, tested, and operated as a generic code, then recompiled to speed up execution for a specific execution instance. In some embodiments, the recompiling and optimization may occur at runtime, while other embodiments may recompile and optimize prior to runtime.

The executable code may be any executable code, including application code, operating system code, services code, or any other set of executable instructions. In many embodiments, executable code that may be written in functional languages or written in functional language style may enable an analysis engine to identify constant values for variables. Since functional languages and programs written in a functional language style may have no mutable state, an analysis engine may readily identify those elements that do not change and may propagate those values throughout the code.

For the purposes of this specification and claims, the term "executable element" may define a set of instructions that may be executed by a processor. In a typical embodiment, an executable element may be machine level commands that may be sent to a processor. A single computer application may be made up of many executable elements. An executable element may also be referred to as a job, application, code chunk, or other term.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
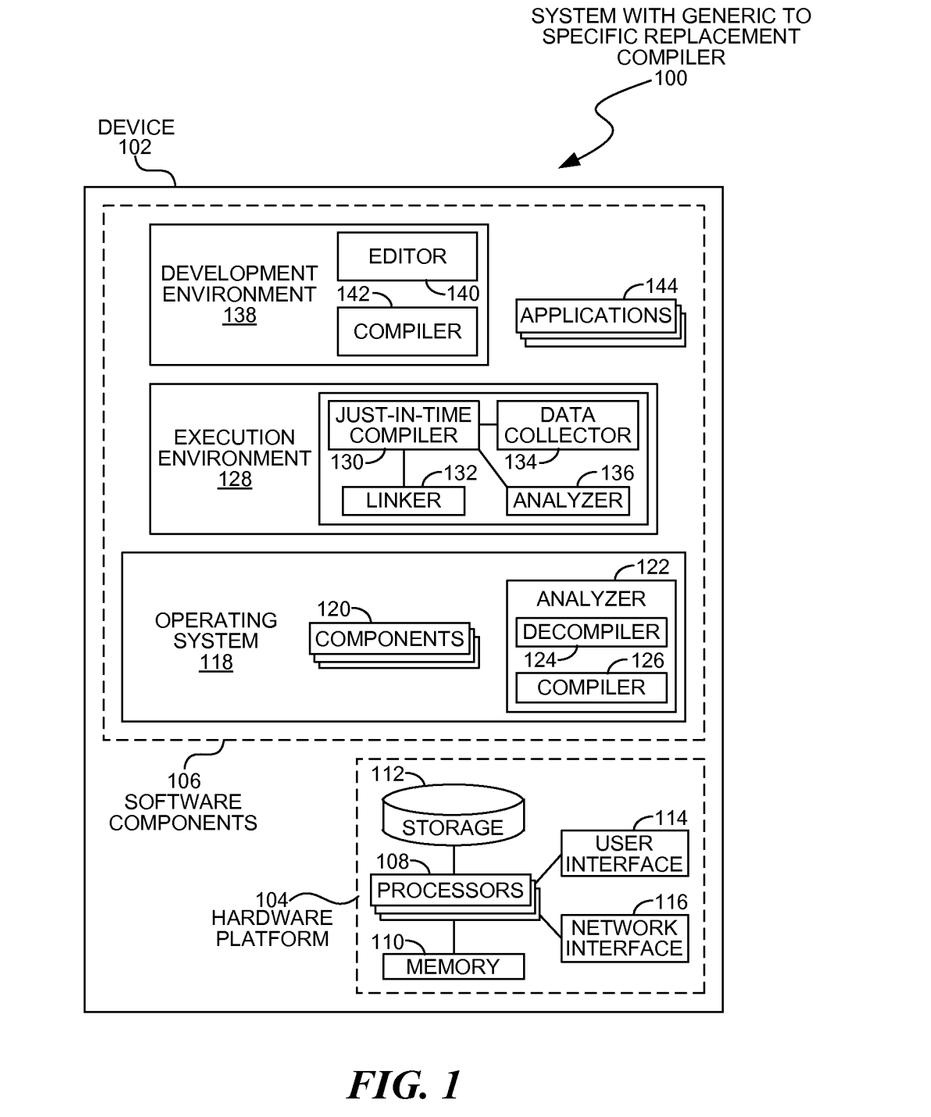
FIG. 1 is a diagram illustration of an embodiment showing a system with code optimization.

FIG. 1 is a diagram of an embodiment 100 showing a system that may analyze executable code to replace generic code with specific code. Embodiment 100 is a simplified example of the various software and hardware components that may be used an execution environment for applications and an operating system.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates a computer system 102 that may create specific code for execution from generic code. The specific code may attempt to replace variables with constants, simplify or remove branches in the generic code, and otherwise streamline the code for execution.

Widely used programming techniques teach programmers to create functions, routines, or other code blocks in a generic manner. Such functions may accept a variable or set of inputs, perform a function, and return a result. The function may be called from many different locations within an application, and the code may be reused for many different input values. Such a function may be tested and validated as a separate unit of code.

Another widely used programming technique may be to create branches for different conditions in a program. A branch may determine that one function may be executed when a value of X is received, while another function may be executed when a value of Y is received. When a branch is determined, a function may be called, causing a computer to keep track of all the function calls using a set of internal pointers and a stack storage mechanism.

Many advanced processors may attempt to identify code that will be executed in the future. Such processors may load the code into a cache memory prior to being executed to avoid a delay when the executable code may be retrieved from main memory. In some cases, code executed from cache may be performed on subsequent clock cycles, while code that may be retrieved from main memory may cause a processor to wait many clock cycles, sometimes over 100 clock cycles later, before the next instruction may be processed.

At a code branch point, the advanced processors may not be able to look ahead and determine which branch of the code may be executed next. Code branches often cause slow performance as the next function or execution may wait until the executable code may be retrieved from main memory after the code branch condition may be evaluated.

An optimization routine for executable code may attempt to minimize or remove branch points by replacing variables with any known constants. Based on the constants, branch points in the executable code may be analyzed to identify branch conditions that may be known. When the branch may be fully determined prior to execution, the branching code may be removed and replaced with a pointer to the code associated with the only branch that may be possible.

The optimization routine may be performed prior to execution. In some cases, the optimization routine may be part of a just-in-time compiler or some other runtime environment that may prepare and manage applications being executed. In other cases, the optimization routine may be part of an operating system, where an analyzer may decompile, analyze, and recompile code for execution. In still other cases, the optimization routine may be performed in a development environment by analyzing source code.

The optimization routine may be performed on programs written in functional languages or in a functional language style. Functional language style consolidates blocks of executable code into units that receive input and return an output without otherwise changing state or receiving state that may be defined outside of the function. Functional language style may treat each block of executable code as independent, separate operations that may not depend on any other input except for that which is passed to the function, as well as not changing the state or value of other objects, except for that which is returned by the function. In many functional languages, a message passing mechanism may transmit and receive the values of parameters passed between functions.

Many functional languages, such as Erlang, Scala, F#, and others may enforce such restrictions on code that may be written and compiled in those languages. Other languages may also be used to write in a functional language style and yield similar results.

The optimization may be readily applied to programs written in a functional language style because the state of variables may be defined when messages are passed between functions. As such, the analysis may be performed by analyzing the connections between functional elements.

In contrast, non-functional languages or applications written in a non-functional language style may allow some variables to be changed, updated, or retrieved within a function, where those variables may not be expressly passed between the functions. In such cases, the analysis for an optimization routine may have more difficulty identifying when variables are changed.

Some applications may be written in a language or style that may identify very small functions that may be linked together in an application. For example, some Erlang programs of moderate size may include many hundreds of thousands if not millions of individual functions connected by message passing. Such situations may allow for fine-grained analysis of parameters passed between functions.

In contrast, some applications written in a functional language style may have large blocks of code that may be treated as independent functions. Some such applications may identify only a handful to several hundred functions that may be considered independent functions. Such situations may allow for a more coarse-grained analysis.

In general, more fine-grained analyses may result in more dramatic improvements in processing speed than more coarse-grained analyses.

The device 102 is illustrated having hardware components 104 and software components 106. The device 102 as illustrated represents a conventional computing device, although other embodiments may have different configurations, architectures, or components.

In many embodiments, the device 102 may be a server computer. In some embodiments, the device 102 may still also be a desktop computer, laptop computer, netbook computer, tablet or slate computer, wireless handset, cellular telephone, game console or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The operating system 118 may be defined using various functional components 120. The components 120 may be blocks of code that operate in a functional language style. In some cases, the components 120 may be written in a functional language.

An analyzer 122 may include a decompiler 124 and compiler 126 and may create optimized executable code using the operating system components 120 as well as applications 144. The optimized executable code may be incorporated into the device's executing code and caused to run.

Figure 3:
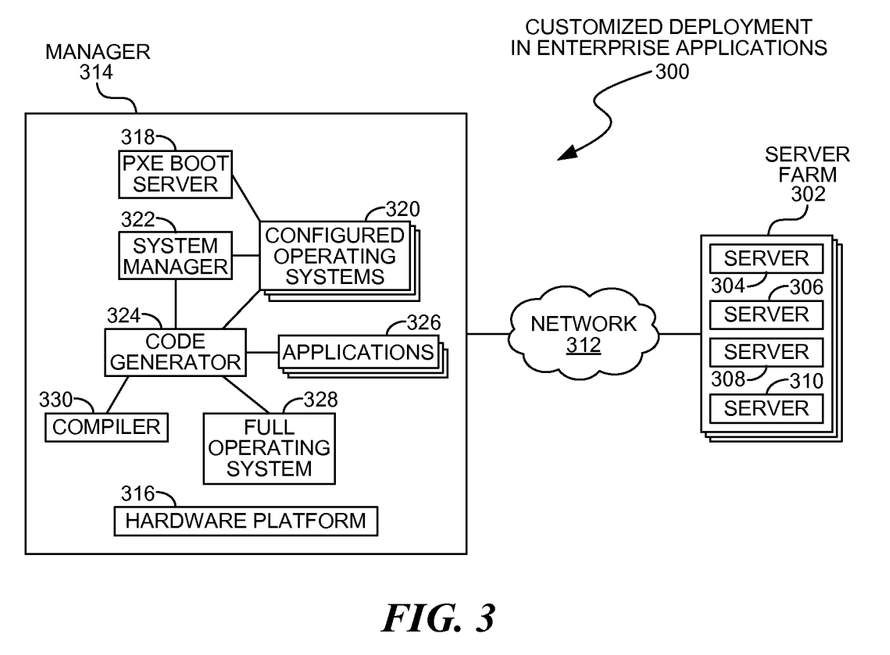
FIG. 3 is a diagram illustration of an embodiment showing an example deployment in a datacenter.

Embodiment 100 illustrates an embodiment where a single device may optimize code that runs on the device. Embodiment 300 presented later in this specification illustrates an embodiment where optimized code may be created and deployed to other devices.

The device 102 may have an execution environment 128 that may analyze and optimize application 144 for execution. An execution environment may be a virtual machine or other environment that may manage execution of applications.

The execution environment 128 may include a just-in-time compiler 130. Some programming environments may create applications in source code, and then compile the source code into intermediate code. The intermediate code may then be compiled at runtime into executable code by a just-in-time compiler 130. The just-in-time compiler 130 may operate with a linker 132 to create a full set of executable code.

The execution environment 128 may have a data collector 134 and an analyzer 136 that may create optimized code. The data collector 134 may determine the value of certain constants prior to execution, and the analyzer 136 may create the optimized code by inserting the constant values and analyzing any branches or conditions within the code.

A development environment 138 may include some programming tools that a developer or programmer may use to create the applications 144. The development environment 138 may include an editor 140 and compiler 142.

Figure 2:
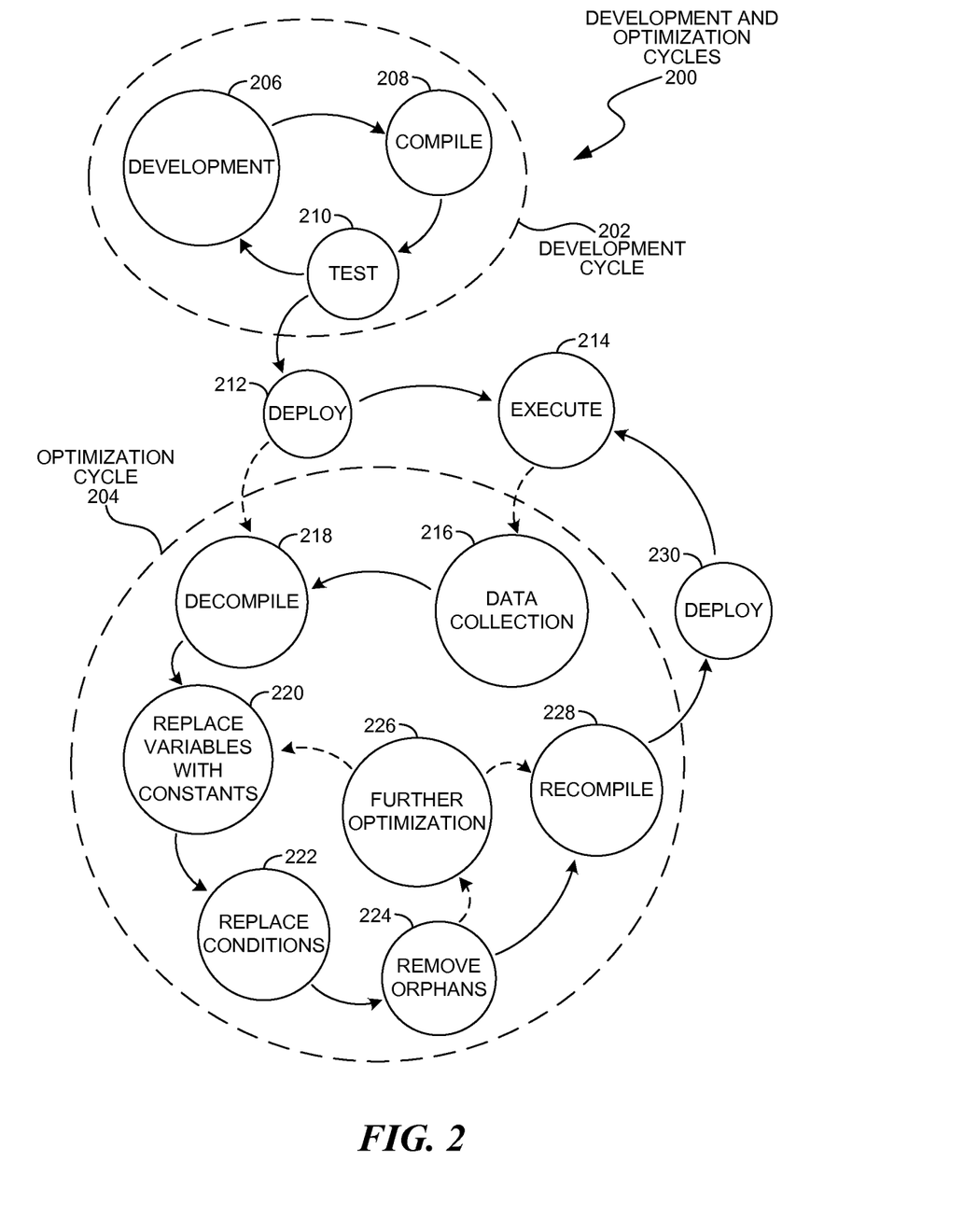
FIG. 2 is a diagram illustration of an embodiment showing development and optimization cycles.

FIG. 2 is a diagram illustration of an embodiment 200 showing steps that may create optimized code. Embodiment 200 may show the development cycle 202 and optimization cycle 204 that may result in optimized executable code.

In the development cycle 202, a programmer may develop code in step 206, compile code in step 208, and test the code in step 210. The development cycle 202 may iterate many times until the programmer may deploy the code in step 212.

The deployed code from step 212 may be executed in step 214 without optimization. In such a case, the deployed code may perform all of its functions as designed. After optimization, the optimized executable code may perform the same functions, but with a much faster throughput.

The optimization cycle 204 may collect data in step 216 to determine any known parameter values. In some embodiments, the data collection step 216 may be a separate application, function, or mechanism to collect information for optimization. For example, an optimization that may include operating system functions may perform a data collection to identify the available hardware, network addresses, and other information that may be used to optimize the performance of the operating system. Such a data collection may be performed by a routine that may be part of an optimization mechanism.

In some embodiments, a data collection step 216 may be performed as a profiled or instrumented analysis of the executable code. In such embodiments, a profiler may collect data while the code may be executing. The data may be analyzed to identify variables that have known or consistent values.

The executable code may be decompiled in step 218. Some embodiments may decompile machine code or intermediate code to create a higher level code that may be more easily analyzed. Other embodiments may access and optimize source code, intermediate code, machine code, or some other form of code, and such embodiments may or may not perform step 218.

In some embodiments, the executable code and a higher level semantic description may be available. The higher level semantic description may be source code, intermediate code, debugger symbols, or some other description. Such embodiments may perform analyses on executable code, decompiled code, or various semantic descriptions to perform the various optimization steps.

Variables may be replaced by constants in step 220. The variables may be those variables determined from step 216 or from analysis of the executable code. The replacements performed in step 220 may remove references to a parameter and replace those references with the actual value of the parameter.

The replacement of step 220 may provide some performance improvements for executable code. In many cases, a reference to a variable value may cause an executing processor to perform a lookup or memory access for that variable. When the variable name may be replaced by a constant value, the processing overhead of accessing the variable value may be avoided, thereby increasing performance.

An analysis of conditional statements may identify conditional statements that may be replaced in step 222. The conditional statements that may be replaced may be those for which the variable values are known and the condition may be evaluated at the time the optimization cycle 204 may be executed. The replacement of conditional statements may remove conditional statements and replace those statements with direct jumps or other pointers to the portion of code that may be executed when the condition is satisfied.

The replacement of conditional statements may provide increased performance, as a processor may be able to 'look ahead' and prepare to execute the code when the condition is satisfied. When a conditional statement exists, a processor may not be able to 'look ahead', as the condition may not be known. In such a situation, the processor may evaluate the condition, then may have to wait as the next set of instructions may be retrieved from main memory prior to continuing execution. By eliminating the wait time associated with processing a condition, performance may be increased.

Orphan code may be identified and removed in step 224. Orphan code may be portions of the executable code that may not be reached during execution. Orphan code may be identified when a condition is replaced in step 222, which may leave an orphaned code block that may not be reached when the condition is removed.

In some embodiments, the process of step 224 may involve creating a control flow graph of the executable code, then analyzing the control flow graph to identify orphaned code.

The process may iterate in step 226 to perform further optimization, in which the process may return to step 220.

Once the optimization is ready for execution, the code may be recompiled in step 228 and deployed in step 230. In some embodiments, the optimization cycle 204 may be performed repeatedly. In one such embodiment, a profiler may gather further data in the data collection step 216 and cause the optimization to be performed again.

FIG. 3 is a diagram illustration of an example embodiment 300 showing a customized deployment of code for an enterprise application. Embodiment 300 is one example of how a code optimization mechanism may be used to deploy customized code to servers in a server farm.

Embodiment 300 illustrates a server farm 302 that may have several servers 304, 306, 308, and 310. In many embodiments, a server farm may have many hundreds, thousands, or even hundreds of thousands of servers. The servers may be connected to a network 312 which may also be connected to a manager 314.

The manager 314 may create and distribute operating systems and applications to the various servers in the form of optimized executable code. While the manager 314 may be illustrated as a single device, other embodiments may have one or more functions described for the manager 314 to be performed by separate devices.

The manager 314 may operate on a hardware platform 316, which may be similar to the hardware platform 106 of embodiment 100.

The manager 314 may have a code generator 324 which may create customized executable code using various applications 326 and a full copy of an operating system 328. The code generator 324 may create a customized executable that is optimized for each specific server. In many cases, different servers may perform different tasks, and as such, the executable code may be optimized for that task.

The code generator 324 may combine the operating system 328 and applications 326 into a single executable, and may perform at least some optimization on the code using, as an example, the process described in embodiment 200. The code generator 324 may create an optimized version of code as described by a system manager 322.

A system manager 322 may determine which server may execute which code, then pass the configuration to the code generator 324. The code generator 324 may then create a configured operating system 320 that may contain an operating system and applications. In some embodiments, the configured operating system 320 may contain only an operating system and applications for a particular server may be downloaded separately.

In some cases, the code generator 324 may operate on decompiled code, intermediate code, or source code, and may use one or more compilers 330 to create the executable code.

A Pre-eXecution Environment (PXE) boot server 318 may receive requests from the various servers at boot time. As part of the communication, a server may request bootable code from the PXE boot server 318. The system manager 322 may determine which version of the configured operating system 320 may be transmitted to the server, and the PXE boot server 318 may transmit the bootable code to the server. In such an embodiment, a set of pre-configured operating systems 320 may be available prior to receiving a request from a server.

In some embodiments, the manager 314 may receive a request for bootable code and then the system manager 322 may cause the code generator 324 to create optimized code. In such an embodiment, the system manager 322 may determine a configuration after the request is received.

Embodiment 300 is an example of a distribution mechanism that may be deployed in a datacenter environment. In other embodiments, a code generator may create optimized code for desktop computers, slate and tablet computers, mobile telephones, hand held scanning devices, sensor devices, or any other computing device. In many cases, the optimization mechanism may speed up the execution of the code while maintaining the same functionality of non-optimized code.

Figure 4:
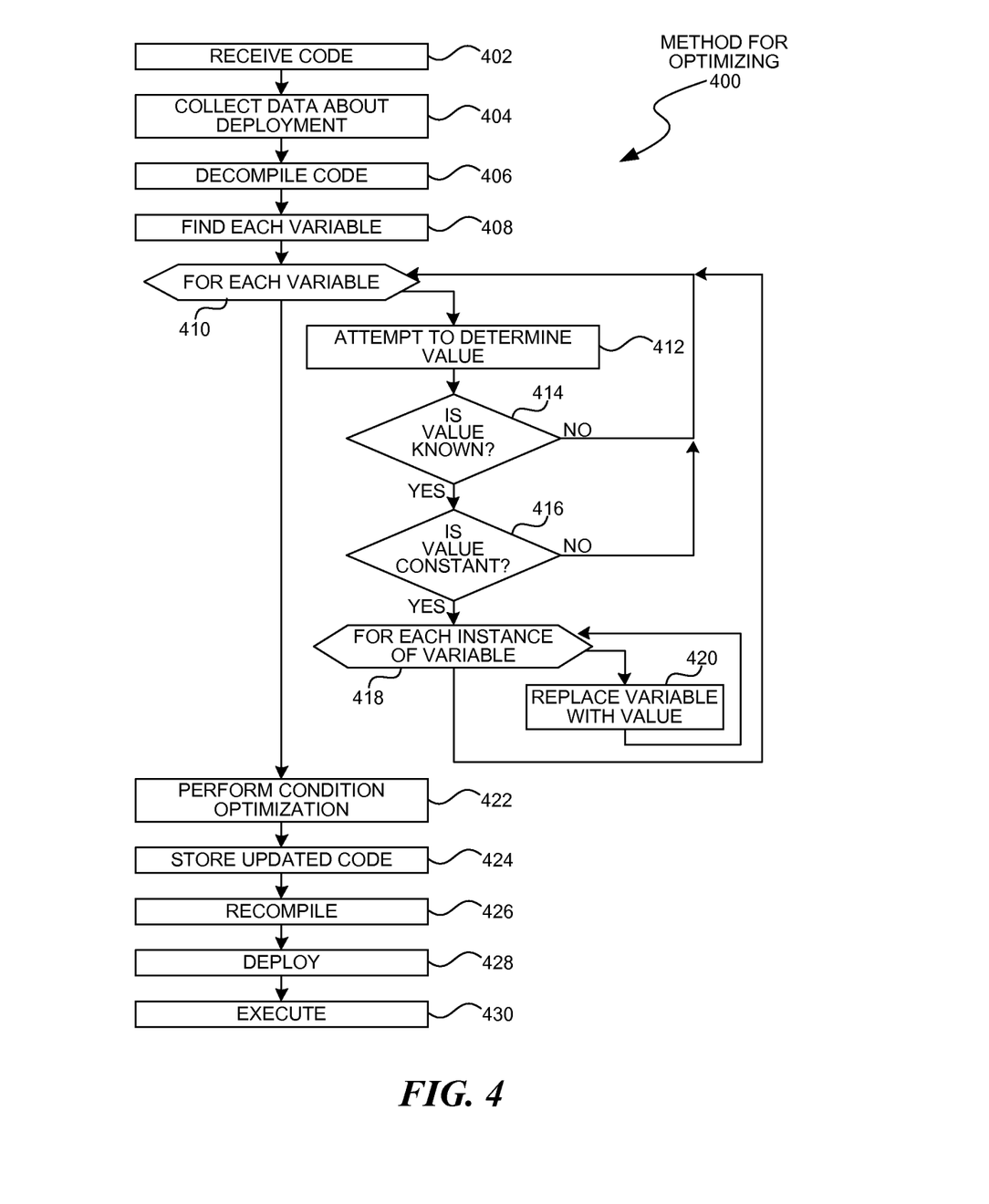
FIG. 4 is a flowchart illustration of an embodiment showing a method for optimizing code.

FIG. 4 is a flowchart illustration of an embodiment 400 showing a method for optimizing code for execution. Embodiment 400 illustrates the operations of an analyzer, such as the analyzers 122 and 136 of embodiment 100, as well as the operations of a code generator, such as the code generator 324 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Figure 5:
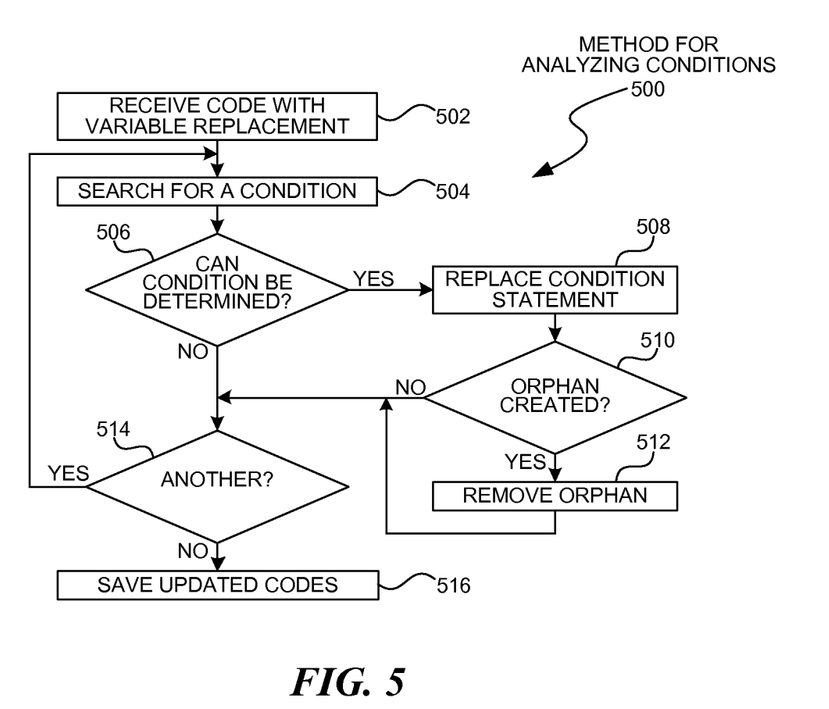
FIG. 5 is a flowchart illustration of an embodiment showing a method for optimizing conditions within code.

Embodiment 400 illustrates a method for optimization where constants may replace variables, and a condition optimization may be performed. An example of a condition optimization may be found in embodiment 500 presented later in this specification.

In block 402, the code to be optimized may be received. The code may include application code and operating system code. In some embodiments, the code may be only operating system code, while other embodiments may process only application code.

Data may be collected about the deployment in block 404. The data may identify any constants that may be collected and used by the executable code.

The code may be decompiled in block 406, and each variable may be identified in block 408. Each variable may be analyzed in block 410. In some embodiments, the code may also be accompanied by debugger symbols, source code, intermediate code, or other semantic description of the code.

The semantic description of the code may make analyzing the code easier in some circumstances.

For each variable in block 410, an attempt may be made in block 412 to determine the value for the variable. If the value is not known in block 414, the process may return to block 410. If the value is known in block 414, and the value is not constant in block 416, the process may return to block 410.

If the value is known in block 414 and the value is constant in block 416, each instance of the variable may be analyzed in block 418. For each instance in block 418, the variable may be replaced by the value in block 420.

The process of blocks 408-420 may put constant values in place of the variables. At this point, a condition optimization may be performed in block 422. An example of a condition optimization is illustrated in embodiment 500 presented later in this specification.

After the optimization may be performed, the updated code may be stored in block 424, recompiled in block 426, and deployed in block 428 to be executed in block 430.

FIG. 5 is a flowchart illustration of an embodiment 500 showing a method for analyzing and optimizing conditions in code. Embodiment 500 illustrates the operations that may be performed in block 422 of embodiment 400.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates a method for optimization where conditions may be analyzed and removed when the conditions are known. Embodiment 500 may also perform orphan removal.

The code may be received in block 502 with variables replaced by constants. The code may be searched to identify a condition in block 504.

If the condition cannot be evaluated using the known constants in block 506 and another condition exists in the code in block 514, the process may return to block 504.

If the condition can be determined given the constants in block 506, the condition statement may be removed in block 508 and replaced with a jump to the executable code associated with the condition. If an orphan code is created in block 510, the orphan may be removed in block 512, otherwise the process may return to block 514 to process another condition.

After the optimization has been performed, the code may be updated in block 516.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising: receiving a set of executable code; instrumenting said executable code;
   executing said executable code to collect data while said executable code executes;
   decompiling said set of executable code;
   determining variables in said executable code for replacement with constant values, wherein said determining comprises:
   receiving a semantic definition of said executable code, said semantic definition being used to identify at least one occurrence of a first variable; and said semantic definition being debugger symbols;
   determining a first constant value for a first variable in said executable code, said first constant value being identified from said data; and
   for each occurrence of said first variable, replacing said first variable with said first constant value to create a first modified set of executable code;
   after determining and replacing variables for constant values, analyzing said first modified set of executable code to identify conditions that are satisfied when said first variable is defined as said first constant value;
   for each of said conditions, removing said conditions from said first modified set of executable code by replacing the condition statements with a jump instruction; and
   recompiling said first modified set of executable code to create a second set of executable code.

2. The method of claim 1 further comprising: identifying an orphan code in a first condition, said first condition being satisfied when said first variable is defined at said first constant value; and removing said orphan code from said first modified set of executable code.

3. The method of claim 2, said executable code being application code.

4. The method of claim 3, said decompiling being performed in an executable environment, said executable environment being separate from an operating system.

5. The method of claim 3, said decompiling being performed in an operating system.

6. The method of claim 4, said second set of modified executable code comprising operating system code.

7. A method comprising:
   receiving a set of executable code;
   instrumenting said executable code;
   executing said executable code to collect data while said executable code executes;
   decompiling said set of executable code;
   determining variables in said executable code for replacement with constant values, wherein said determining comprises:
   identifying links from said application code to operating system code and incorporating said operating system code into said set of executable code;
   receiving a semantic definition of said executable code, said semantic definition being used to identify at least one occurrence of a first variable; and said semantic definition being debugger symbols;
   determining a first constant value for a first variable in said executable code, said first constant value being identified from said data; and
   for each occurrence of said first variable, replacing said first variable with said first constant value to create a first modified set of executable code;
   after determining and replacing variables for constant values, analyzing said first modified set of executable code to identify conditions that are satisfied when said first variable is defined as said first constant value;
   for each of said conditions, removing said conditions from said first modified set of executable code by replacing the condition statements with a jump instruction; and recompiling said first modified set of executable code to create a second set of executable code.

8. The method of claim 7 further comprising: downloading said second set of executable code to a client device.

9. The method of claim 8, said second set of executable code being the complete set of executable code executing on said client device.

\* \* \* \* \*